United States Patent
Lomoelder et al.

(10) Patent No.: US 6,492,482 B2
(45) Date of Patent: Dec. 10, 2002

(54) NONAQUEOUS, HEAT-CURABLE TWO-COMPONENT COATING

(75) Inventors: Rainer Lomoelder, Muenster (DE); Friedrich Plogmann, Castrop-Rauxel (DE); Peter Speier, Marl (DE)

(73) Assignee: Deguss-Huels Aktiengesellschaft, Frankfurt (DE)

( * ) Notice: Subject to any disclaimer, the term of this patent is extended or adjusted under 35 U.S.C. 154(b) by 0 days.

(21) Appl. No.: 09/726,554

(22) Filed: Dec. 1, 2000

(65) Prior Publication Data

US 2002/0042471 A1 Apr. 11, 2002

(30) Foreign Application Priority Data

Sep. 30, 2000 (DE) .......................................... 100 48 615

(51) Int. Cl.[7] .......................... C08G 65/48; C08G 77/26; C08L 75/00
(52) U.S. Cl. .......................... 528/38; 524/589; 525/393; 525/395
(58) Field of Search .............................. 525/393, 330.5, 525/395; 528/38; 524/589

(56) References Cited

U.S. PATENT DOCUMENTS

| 4,474,933 A | * | 10/1984 | Huber et al. |
| 5,225,248 A | * | 7/1993 | Stephenson |
| 5,854,338 A | * | 12/1998 | Hovestadt et al. |
| 6,005,047 A | * | 12/1999 | Shaffer et al. |
| 6,197,912 B1 | * | 3/2001 | Huang et al. |

* cited by examiner

Primary Examiner—Tae H. Yoon
(74) Attorney, Agent, or Firm—Oblon, Spivak, McClelland, Maier & Neustadt, P.C.

(57) ABSTRACT

A nonaqueous, heat-cured, two-component coating has a combination of good scratch resistance and resistance to etching by acid rain and comprises a solvent-containing polyol component and a cross-linking component. The cross-linking component comprises at least one aliphatic and/or cycloaliphatic polyisocyanate having 2 to 6 NCO functional groups per molecule in which 0.1 to 95 mol % of the isocyanate groups of the polyisocyanate are reacted with an N-alkyl-3-aminopropyltrialkoxysilane and/or an N-aryl-3-aminopropyltrialkoxysilane. The weight ratio of the polyol to the cross-linking component in the coating is 6:1 to 1:2.

16 Claims, No Drawings

NONAQUEOUS, HEAT-CURABLE TWO-COMPONENT COATING

BACKGROUND OF THE INVENTION

1. Field of the Invention

The present invention is a nonaqueous, heat-curable, two-component coating with an improved balance of scratch resistance and resistance to environmental damage, especially to etching caused by exposure to acid rain.

2. Discussion of the Background

Two-component polyurethane (PUR) coatings are used as top coats in the automotive industry because they have superior resistance to environmental damage, particularly etching caused by exposure to acid rain, compared to conventional coating systems comprising cross-linking melamine resins (W. Wieczorrek in: Stoye/Freitag, Lackharze, pp. 215 ff., C. Hanser Verlag, 1996; J. W. Holubka et al., J. Coat. Techn. Vol. 72, No. 901, p. 77, 2000). Generally, PUR coatings are composed of poly(meth) acrylate resins having OH functional groups and polyisocyanates based on hexamethylene diisocyanate (HDI). The good resistance of these PUR coatings to environmental damage can be significantly improved by substituting IPDI (isophorone diisocyanate) polyisocyanates for some of the HDI (WO 93/05090). However, such modified PUR top coating materials have poorer scratch resistance than pure HDI cross-linked polyisocyanate coatings (Industrie Lackierbetrieb, 61, p. 30, 1993).

Reaction products of polyisocyanates with secondary 3-aminopropyltrialkoxysilanes are known. For example, 3-aminopropyltrialkoxysilanes modified with esters of maleic or fumaric acid are reacted with isocyanate prepolymers in order to improve the adhesion of corresponding coating systems or sealing compounds and to reduce the detrimental evolution of $CO_2$ (European Patent 596360, U.S. Pat. No. 6,005,047). Such isocyanate adducts are also described for the preparation of aqueous PUR dispersions (European Patent 924231) or as hardener components for aqueous two-component PUR systems (European Patent 872499, European Patent 949284). In the great majority of cases, the coatings are cured at ambient temperature or slightly elevated temperature in the presence of water vapor.

European Patent 549643, International Patent WO 92/11327, International Patent WO 92/11328 and U.S. Pat. No. 5,225,248 describe the use of silane group-containing resins in nonaqueous, heat-cured clear coatings in order to improve the damage resistance, especially with respect to acid rain, for top coatings of automobiles. In these patents, the clear coatings contain cross-linkers based on silane group-containing poly(meth)acrylate resins, on hydroxyl-group-containing poly(meth)acrylate resins, and on melamine resins. Such clear coatings are commonly considered to be acid-resistant, but are clearly inferior to two-component PUR coatings (J. W. Holubka et al., J. Coat. Techn. Vol. 72, No. 901, p. 77, 2000).

Because the quality requirements for top coats for automobiles have become increasingly stringent, an improved balance of scratch resistance and environmental damage resistance is desired. The present invention is a two-component coating which has a better balance of resistance to environmental damage, and at the same time greater resistance to mechanical damage, especially scratch resistance.

SUMMARY OF THE INVENTION

The present invention comprises a nonaqueous, heat-cured, two-component coating containing A) a solvent-containing polyol component and B) a cross-linking component, comprising a cross-linking agent prepared by reacting at least one aliphatic and/or cycloaliphatic polyisocyanate having 2 to 6 NCO functional groups, wherein 0.1 to 95 mol % of the originally free isocyanate groups of the polyisocyanate are reacted with N-alkyl-3-aminopropyltrialkoxysilanes and/or N-aryl-3-aminopropyltrialkoxysilanes, and the weight ratio of the polyol of component A to the cross-linking agent of component B in the coating is 6:1 to 1:2.

DETAILED DESCRIPTION OF THE INVENTION

In principle, polyol component A may include all polyols containing more than two OH groups. For example, polyol component A may be (meth)acrylic copolymers containing hydroxyl groups, saturated polyester polyols, polycarbonate diols, polyether polyols, polyester-urethane polyols, or mixtures thereof.

The solvent used in component A may be any conventional organic solvent used in coatings. For example, the solvent may be a ketone (i.e., acetone, methyl ethyl ketone, etc.), an aliphatic or aromatic hydrocarbon, and ester (i.e., butyl actetate, etc.), or any other suitable solvent which can dissolve the polyol. However, the solvent should not include water.

The (meth)acrylic copolymers containing hydroxyl groups may be resins having the monomer composition described in, for example, International Patent WO 93/15849 (p. 8, line 25 to p. 10, line 5), or else in German Patent 19529124. For example, the (meth) acrylate copolymers may be copolymers containing (meth)acrylate esters and (meth)acrylate hydroxyalkylesters (e.g., 2-hydroxyethyl methacrylate and 2-hydroxypropyl methacrylate). The acid number of the (meth)acrylic copolymer may be adjusted by using (meth)acrylic acid as a comonomer, and should be 0 to 30 mg KOH/g, preferably 3 to 15 mg KOH/g. The number-average molecular weight (determined by gel permeation chromatography versus a polystyrene standard) of the (meth)acrylic copolymer is preferably 2,000 to 20,000 g/mol, and the glass transition temperature is preferably $-40°$ C. to $+60°$ C. The hydroxyl content of the (meth) acrylic copolymer of the present invention, which may be adjusted by adding hydroxyalkyl(meth)acrylate comonomers, is preferably 70 to 250 mg KOH/g, more preferably 90 to 190 mg KOH/g. Any other vinyl monomer which can be copolymerized with the (meth)acrylate monomers may also be used, provided these additional monomers do not compromise the desired performance properties of the ultimate coating (i.e., resistance to scratching and environmental damage). By "(meth)acrylate", we mean monomers derived from methacrylic acid and/or acrylic acid (i.e., methacrylic esters and acrylic esters, methacrylic hydroxyalkyl esters and acrylic hydroxyalkyl esters, etc.).

Polyester polyols which may be used in the present invention include resins prepared by reacting dicarboxylic and polycarboxylic acid monomers with diols and polyols, as described in, for example, Stoye/Freitag, Lackharze, C. Hanser Verlag, 1996, p. 49, or in International Patent WO 93/14849. The polyester polyols may also be polyaddition products of caprolactone and low molecular weight diols and triols, such as those available under the name TONE (Union Carbide Corp.) or CAPA (Solvay/Interox). The theoretical number-average molecular weight of such polyester polyols is preferably 500 to 5,000 g/mol, more preferably 800 to 3,000 g/mol, and the average number of functional groups per molecule is 2.0 to 4.0, preferably 2.0 to 3.5.

Polyester-urethane polyols which may be used in the present invention include those described in European Patent 140186. For example, suitable polyester-urethane polyols may be prepared by reacting an organic polyisocyanate with any of the polyester polyols described above (i.e., polyester polyols formed by reacting an organic polycarboxylic acid with a polyol). Preferred polyester-urethane polyols include those prepared by reacting any of HDI, IPDI, trimethylhexamethylene diisocyanate (TMDI) or ($H_{12}$-MDI) with a polyester polyol. The number-average molecular weight of such polyester-urethane polyols is preferably 500 to 2,000 g/mol, and the average number of functional groups per molecule is 2.0 to 3.5.

Cross-linking component B comprises a cross-linking agent prepared by reacting at least one aliphatic and/or cycloaliphatic polyisocyanate containing 2 to 6 NCO functional groups per molecule, wherein 0.1 to 95 mol % of the originally free isocyanate groups of the polyisocyanate are reacted with at least one N-alkyl-3-aminopropyltrialkoxysilane and/or at least one N-aryl-3-aminopropyltrialkoxysilane.

The polyisocyanate of component B may be any diisocyanate or a polyisocyanate based on hexamethylene diisocyanate (HDI), isophorone diisocyanate (IPDI), bis(4-isocyanatocyclohexyl)methane, ($H_{12}$-MDI), tetramethylxylylene diisocyanate (TMXDI), 1,3-bis(isocyanatomethyl)cyclohexane (1,3-H-XDI), 2,2,4-trimethyl-1,6-diisocyanatohexane and 2,4,4-trimethyl-1,6-diisocyanatohexane (TMDI), 2-methylpentene diisocyanate-1,5 (MPDI), norbornyl diisocyanate (NBDI), lysine triisocyanate (LTI) or 4-isocyanatomethyl-1,8-octamethylene diisocyanate (NTI) or mixtures of these diisocyanates, and the mean number of NCO functional groups per molecule ranges from 2.0 to 6.0. Suitable diisocyanates include, but are not limited to HDI, IPDI, $H_{12}$-MDI, TMXDI, 1,3-H-XDL TMDI, MPDI, NBDI, LTI, and NTI.

In order to have more than two NCO functional groups per isocyanate molecule, polyisocyanates are preferably used—alone or in mixtures—such as those synthesized by trimerization, dimerization or formation of urethane, biuret or allophanate groups from any of the above diisocyanates, as well as mixtures thereof with monomers. Such polyisocyanates or polyisocyanate/monomer mixtures may be chain extended or branched if appropriate by reaction with difunctional or polyfunctional H-acid components such as diols or polyols and/or diamines or polyamines.

The aliphatic and/or cycloaliphatic cross-linking component B of the present invention is obtained by modifying the polyisocyanates by reaction with N-alkyl-3-aminopropyltrialkoxysilanes and/or N-aryl-3-aminopropyltrialkoxysilanes having the general formula I

$$R\text{—}NH\text{—}(CH_2)_3\text{—}Si(OR^1)_3 \quad (I)$$

where R is an alkyl, iso-alkyl, tert-alkyl, cycloalkyl or aryl group having 1 to 10 carbon atoms and the $R^1$ groups may be, independently of one another, an alkyl or iso-alkyl group having 1 to 8 carbon atoms. Preferably, the compounds of formula I may be n-butyl-3-aminopropyl- triemthoxysilane, n-butyl-3-aminopropyltriethoxysilane, n-butyl-3-aminopropyl-tri-i- propoxysilane, methyl-3-aminopropyl-trimethoxysilane, methyl-3-aminopropyltriethoxy- silane, methyl-3-aminopropyltri-i-propoxysilane, phenyl-3-aminoprolytriethoxysilane, phenyl-3-aminopropyltrimethoxysilane, phenyl-3-aminopropyltri-i-propoxysilane, cyclohexyl-3-aminopropyltriethoxysilane, cyclohexyl-3-aminopropyltrimethoxysilane, or cyclohexyl-3-aminopropyltri-i-propoxysilane.

An alternative method for preparing cross-linking component B comprises the partial reaction of monomeric diisocyanates with the aforementioned compounds of formula I, followed by trimerization, dimerization to form a polyisocyanate, or by formation of urethane, biuret or allophanate compounds from the polyisocyanate, and then, if necessary, distilling away residual monomers. Mixtures of unmodified polyisocyanates and completely reacted polyisocyanates may also be used in the present invention.

The cross-linking component B of the present invention may be carried out in the liquid phase at temperatures below 130° C., and any aprotic solvents which are typically used in PUR technology may be used, if necessary. In addition, catalysts and/or stabilizers may also be used, if necessary.

The nonaqueous, two-component coating of the present invention usually contains solvents well known in coating technology, such as ketones, esters or aromatics, and adjuvants such as stabilizers, UV stabilizers, hindered amine light stabilizers (HALS), catalysts, leveling agents or rheological adjuvants, such as "sag control agents", microgels or pyrogenic silicon dioxide in typical concentrations.

Catalysts known to be effective in PUR coatings, such as organic Sn(IV), Sn(II), Zn and Bi compounds or tertiary amines (PUR catalysts), are preferred catalysts.

Latent sulfonic-acid-based catalysts, i.e., organic sulfonic acids neutralized by amines or covalent adducts of organic sulfonic acids with epoxy-containing compounds, particularly those described in German Unexamined Patent Application DE-OS 2356768, are also suitable catalysts.

Combinations of PUR catalysts and latent sulfonic-acid-based catalysts are particularly preferred. An especially preferred coating has 0.01 to 0.5 wt % PUR catalyst and 0.1 to 7 wt % latent sulfonic-acid-based catalyst, relative to the nonvolatile organic constituents of the coating.

If necessary inorganic or organic coloring and/or special effect pigments (i.e., metal flakes, etc.) which are commonly used in coating technology may also be incorporated into component A.

The weight ratio of the polyol of component A to component B in the coating of the present invention ranges from 6:1 to 1:2. Other nonvolatile organic components of the coating may include nonvolatile resins, catalysts, adjuvants, etc. in the coating. Volatile components include solvents which have an appreciable vapor pressure at room temperature and atmospheric pressure (e.g., ketone, ester or aromatic solvents typically used in coatings).

Components A and B are intimately mixed until a homogeneous solution is obtained, just before they are used in a coating process. So-called two-component mixing systems may be used for mixing components A and B on a large industrial scale.

The coating of the present invention may be applied by known methods such as spraying, dipping, rolling or doctoring. The substrate to be coated may already be coated with other coating layers. The coating of the present invention is particularly suitable for use as a clear coating, in which case it is applied in the so-called wet-in-wet process on one or more base coating layers, which are all cured at the same time. The coating of the present invention may be cured at a temperature range of 100 to 180° C. The coating of the present invention may be used for production of clear or top coats for motor vehicles.

Having generally described this invention, a further understanding can be obtained by reference to certain specific examples which are provided herein for purposes of illustration only, and are not intended to be limiting unless otherwise specified.

EXAMPLES

Unless otherwise indicated, quantities relate to weights.

I. Preparation of Cross-linking Component B1

18.1 parts by weight of N-butyl-3-aminopropyltrimethoxysilane (DYNASYLAN 1189, Degussa-Hüls AG) are added dropwise over 1 hour to 67.0 parts by weight of VESTANAT T 1890 L (70% solution of IPDI polyisocyanate (isocyanurate) in 1:2 butyl acetate/Solvesso 100, Degussa-Hüls AG) and 14.90 parts by weight of a solvent mixture comprising 1:2 butyl acetate/Solvesso 100. During addition of the N-butyl-3-aminopropyltrimethoxysilane, the mixture is cooled to ensure that the temperature does not exceed 30° C. After all of the silane has been added, the mixture is stirred for 1 hour at ambient temperature. The solids content of the solution is 65%, the free NCO content is 4.7% and the viscosity (DIN 53019, 23° C.) is 640 mPas.

The degree of silanization is 40% relative to the number of equivalents of NCO groups introduced.

II. Preparation of Cross-linking Component B2

24.6 parts by weight of N-butyl-3-aminopropyltrimethoxysilane (DYNASYLAN 1189, Degussa-Hüls AG) are added dropwise over 1 hour to 50.4 parts by weight DESMODUR N 3300 (HDI polyisocyanate (isocyanurate), Bayer AG) and 25.0 parts by weight of 1:2 butyl acetate/Solvesso 100. During addition of the N-butyl-3-aminopropyltrimethoxysilane, the mixture is cooled to ensure that the temperature does not exceed 30° C. After all of the silane has been added, the mixture is stirred for 1 hour at ambient temperature. The solids content of the solution is 75%, the free NCO content is 6.2% and the viscosity (DIN 53019, 23° C.) is 760 mPas.

The degree of silanization is 40% relative to the number of equivalents of NCO groups introduced.

III. Preparation of a Two-component Coating According to the Present Invention

Table 1 presents the compositions of two-component coating of Examples 1 to 6 according to the present invention, and of Comparative Examples 1, 2 and 3 (not according to the present invention).

First, all of the components were intimately mixed, with the exception of the polyisocyanates (rows 1 to 4 in Table 1) until complete homogenization of the mixture was achieved. The mixture and cross-linking component B are then mixed until homogeneous immediately before use.

Solvents (rows 11, 12, Table 1) were used for preliminary dilution of the polyisocyanate, in order to adjust the viscosity of each component to appropriate values and to achieve the desired mixing ratios.

TABLE 1

Two-component clear-coating compositions (parts by weight)

| Example | Comparison 1 | No. 1 | No. 2 | Comparison 2 | No. 3 | Comparison 3 | No. 4 | No. 5 | No. 6 |
|---|---|---|---|---|---|---|---|---|---|
| DESMODUR N 3300 (Bayer AG, Germany) | 16.4 | | 10.6 | | | | | | |
| VESANAT T 1890 L (Degussa-Hüls AG, Germany) | | | | | | 28.4 | | | |
| Cross-linking component B1 | | | | | | | 36.6 | 35.7 | 35.7 |
| Cross-linking component B2 | | 36.3 | 35.5 | | 26.7 | | | | |
| SYNTHALAN HS 86B (Synthopol-Chemie, Germany) | | | | | | 46.2 | 38.9 | 38.0 | 38.0 |
| MACRYNAL SM 510 N (Vianova Resins, Austria) | 52.3 | 33.4 | 32.7 | 56.0 | 41.0 | | | | |
| DBTL | 0.005 | 0.005 | 0.005 | 0.005 | 0.005 | 0.03 | 0.06 | 0.03 | |
| DYNAPOL Catalyst 1203 (Degussa-Hüls AG, Germany | | | 2.3 | | | | | 2.7 | 2.7 |
| TINUVIN 292 (Ciba, Switzerland) | 0.24 | 0.24 | 0.24 | 0.25 | 0.23 | 0.29 | 0.28 | 0.28 | 0.28 |
| TINUVIN 900 (Ciba, Switzerland) | 0.24 | 0.24 | 0.24 | 0.25 | 0.23 | 0.29 | 0.28 | 0.28 | 0.28 |
| Butyl acetate | 12.8 | 14.8 | 14.4 | 13.7 | 14.7 | 10.0 | 9.3 | 8.7 | 8.7 |
| Xylene | 12.8 | 14.8 | 14.4 | 13.7 | 14.7 | 6.6 | 6.4 | 6.3 | 6.3 |
| Dibasic ester | 5.0 | | | 5.3 | 2.0 | | | | |
| Butyl glycol acetate | | | | | | 3.0 | 3.0 | 3.0 | 3.0 |
| FLUORAD FC 430 (3M, USA) | 0.2 | 0.2 | 0.2 | 0.2 | 0.45 | | | | |
| BYK 333 (BYK-Chemie, Germany) | | | | | | 0.2 | 0.2 | 0.2 | 0.2 |
| BYK Spezial (BYK-Chemie, Germany) | | | | | | 5.0 | 5.0 | 4.8 | 4.8 |

Two-component clear coatings, formulated in parts by weight, are presented in Table 1. The viscosity of these clear coatings, expressed as the outflow time in a DIN-4 beaker at 23° C., was about 20 seconds.

Test panels used to test the scratch resistance were prepared by spraying the clear coatings in a wet-in-wet process onto a black base coat (Permacron, Spies Hecker Co., application by spraying, followed by solvent flash-off for 10 minutes at ambient temperature). After solvent flash-off for an additional 5 minutes, the samples were cured for 25 minutes at 140° C. The layer thickness of the dried film of clear coating was about 35 $\mu$m. The scratch resistance was determined after 14 days of storage at ambient temperature Test panels used to evaluate the acid rain etch resistance were prepared by spraying the clear coatings using the above process on a silver metallic base coat (STANDOX VWL 97A, diamond silver of the Herberts Co.) on so-called gradient-furnace panels (BYK Gardner), and cured.

Mechanical characteristics and general damage resistance properties were determined for one-layer clear coatings, applied on phosphated steel panels (Bonder 26), cured for 25 minutes at 140° C.

Scratch Resistance Test

A 45 mm×20 mm nylon fabric with mesh width of 31 $\mu$m is weighed down by means of a 2-kg weight on the test panel, which itself is fixed on a slide, positioned and immobilized. After application of 1 ml of a stirred, 0.25% detergent solution (Persil) directly in front of the test surface, the test panel is oscillated with a maximum deflection of about 3.5 cm in each direction. After 80 forward and back movements (1 per second), the remaining detergent fluid is rinsed off with tap water and the panel is dried with compressed air. Gloss measurements (at a 20° angle) are made before and after the test.

Influence of Temperature on Recovery (Reflow)

The damaged test panel is stored for 2 hours at 60° C. in a circulating-air oven, after which the gloss of the coating is measured once again.

Acid Etch Resistance Test

Drops (about 0.25 ml) of 20% sulfuric acid solution are applied at a spacing of 2 cm on the test panels by means of a pipette. Thereafter the test panels are heated for 30 minutes in a temperature-gradient oven (BYK Gardner) with a temperature gradient of 35 to 80° C. in the long direction of the panel. Acid residues are then washed away with water and a visual inspection is performed 24 hours later. The acid etch resistance is expressed as the temperature range in ° C. in which visible etching of the clear coating and visible destruction of the base coat first become apparent. A higher temperature means a correspondingly higher resistance of the clear coating to acid damage.

TABLE 2

Mechanical and scratch and etch resistance properties of clear coating compositions

| | Example Comparison 1 | No. 1 | No. 2 | Comparison 2 | No. 3 | Comparison 3 | No. 4 | No. 5 | No. 6 |
|---|---|---|---|---|---|---|---|---|---|
| Layer thickness ($\mu$m) | 40 | 35 | 35 | 30 | 30 | 45 | 30 | 30 | 30 |
| Hardness, König (g) | 195 | 165 | 189 | 189 | 176 | 160 | 166 | 160 | 162 |
| Erichsen indentation (mm) | 7.0 | 8.0 | 7.0 | 9.5 | 8.5 | 7.5 | 7.0 | 7.0 | 7.0 |
| Ball impact, direct (inch*lbs) | >80 | >80 | 80 | 80 | 80 | 70 | >80 | 60 | 70 |
| Resistance to super gasoline | very good | very good | very good | very good | very good | very good | very good | very good | very good |
| Resistance to MEK wiper fluid (forward and back movements) | >150 | >150 | >150 | >150 | >150 | >150 | >150 | >150 | >150 |
| Acid etch resistance: | | | | | | | | | |
| Etching of clear coating in ° C. | 53 | 52 | 47 | 56 | 48 | 56 | 56 | 52 | 45 |
| Destruction of base coat in ° C. | 66 | 69 | 71 | 63 | 66 | 72 | 71 | 74 | 75 |
| Scratch resistance: | | | | | | | | | |
| Initial gloss, 20° | 85.2 | 83.8 | 84.1 | 84.5 | 83.3 | 78.8 | 78.2 | 78.9 | 78.4 |
| Gloss different after test, 20° | 30.5 | 30.7 | 12.3 | 48.7 | 37 | 59.3 | 54.8 | 28.9 | 24.7 |
| Gloss difference relative to initial gloss after reflow (60° C.), 20° | 19.4 | 2.6 | 6.8 | 28.9 | 2.9 | 12.7 | 11.9 | 7.5 | 6.0 |

The clear coating according to Example 1 was cross-linked in the same OH:NCO ratio as that of Comparison Example No. 1. It has very comparable acid resistance and significantly better reflow behavior.

In Example No. 2, the additional catalysis with sulfonic acid leads to much better scratch resistance than in Comparison I and Example 1, while the reflow behavior is good.

Comparison Example 2 and Example No. 3 are cross-linked with an OH:NCO ratio of 1:0.6. Example No. 3 exhibits much better reflow properties in combination with acceptable acid resistance.

Example No. 4 shows that, by means of silane-modified polyisocyanates and clearly substoichiometric urethane cross-linking (OH:NCO=1:0.6), a properties essentially identical to that of a stoichiometric two-component PUR formulation (Comparison Example No. 3) may be obtained. The additional sulfonic acid catalysis in Example No. 5 leads to significantly improved scratch resistance as well as good reflow behavior. Catalysis exclusively with sulfonic acid, as in Example No. 6, results in good scratch resistances but poorer acid resistance.

The improved resistance properties of nonaqueous two-component PUR systems modified with N-alkyl-3-aminopropyltrialkoxysilanes of the present invention is especially surprising because silane and melamine containing clear coatings, as described above, generally have poorer properties than two-component PUR coatings.

The priority document of the present application, German patent application 10048615.0 filed Sep. 30, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A nonaqueous, heat curable, two-component coating comprising:
   A) a solvent-containing polyol component; and
   B) a cross-linking component comprising a cross-linking agent prepared by reacting at least one of an aliphatic and cycloaliphatic polyisocyanate having 2 to 6 NCO functional groups per molecule with at least one of an N-alkyl-3- aminopropyltrialkoxysilane and an N-aryl-3-aminopropyltrialkoxysilane,
   wherein said nonaqueous, heat curable, two-component coating contains at least 18% by weight of a solvent or a mixture of solvents, from 0.1 to 95 mol % of said isocyanate groups originally present in the polyisocyanate are reacted with at least one of said N-alkyl-3- aminopropyltrialkoxysilane and said N-aryl-3-aminopropyltrialkoxysilane, and said polyol of component A and said cross-linking agent of component B are in a weight ration of from 6:1 to 1:2.

2. The coating of claim 1, wherein the polyol of component A is a polyol selected from the group consisting of a (meth)acrylic copolymer containing hydroxyl groups, a saturated polyester polyol, a polycarbonate diol, a polyether polyol, a polyester-urethane polyol, and mixtures thereof.

3. The coating of claim 2, wherein the (meth)acrylic copolymer has a number-average molecular weight of 2,000 to 20,000 g/mol, a glass transition temperature of −40° C. to +60° C. and a hydroxyl content of 70 to 250 mg KOH/g.

4. The coating of claim 2, wherein the polyester polyol has a mean number of hydroxyl functional groups of 2.0 to 4.0 per molecule, and a number-average molecular weight of 500 to 5,000 g/mol.

5. The coating of claim 2, wherein said polyester-urethane polyol is prepared from a polyester polyol and an isocyanate selected from the group consisting of hexamethylene diisocyanate (HDI), isophorone diisocyanate (IPDI), 2,4,4-trimethyl-1,6- diisocyanatohexane (TMDI), bis(4-isocyanatocyclohexyl)methane ($H_{12}$-MDI), and mixtures thereof, and the polyester-urethane polyol has a number average molecular weight of 500 to 2,000 g/mol.

6. The coating of claim 1, wherein said polyisocyanate is selected from the group consisting of hexamethylene diisocyanate (HDI), isophorone diisocyanate (IPDI), bis(4-isocyanatocyclohexyl)methane ($H_{12}$-MDI), tetramethyxylylene diisocyanate (TMXDI), 1,3-bis(isocyanatomethyl) cyclohexane (1,3-H-XDI), 2,4,4-trimethyl-1,6-diisocyanatohexane (TMDI), 2-methylpentene 1,5-diisocyanate (MPDI), norbornyl diisocyanate (NBDI), lysine triisocyanate (LTI), 4-isocyanatomethyl-1,8-octamethylene diisocyanate (NTI), and mixtures thereof.

7. The coating of claim 1, wherein the polyisocyanate is prepared by reacting an isocyanate to form a compound selected from the group consisting of a dimer, trimer, urethane, biuret, allophanate, or mixtures thereof.

8. The coating of claim 1, wherein component B comprises a mixture of at least one polyisocyanate and at least one monomeric diisocyanate.

9. The coating of claim 1, wherein the polyisocyanate is chain extended or branched.

10. The coating of claim 1, wherein the polyisocyanate is reacted with a silane of formula I:

$$R-NH-(CH_2)_3-Si(OR^1)_3 \qquad (I)$$

where R is an alkyl, iso-alkyl, tert-alkyl, cycloalkyl or aryl group having 1 to 10 carbon atoms and the groups $R^1$ are, independently of one another, an alkyl or iso-alkyl group with 1 to 8 carbon atoms.

11. The coating of claim 10, wherein the silane is selected from the group consisting of n-butyl-3-aminopropyltrimethoxysilane, n-butyl-3-aminopropyltriethoxy- silane, n-butyl-3-aminopropyltri-i-propoxysilane, methyl-3-aminopropyltrimethoxysilane, methyl-3-aminopropyltriethoxysilane, methyl-3-aminopropyltri-i-propoxysilane, phenyl-3-aminopropyltriethoxysilane, phenyl-3-aminopropyltrimethoxysilane, phenyl-3-cyclohexyl-3-aminopropyltriethoxysilane, cyclohexyl-3-aminopropyltrimethoxysilane, cyclohexy-3-aminopropyltri-i-propoxysilane, and mixtures thereof.

12. The coating of claim 1, further comprising at least one adjuvant selected from the group consisting of a stabilizer, UV stabilizer, HALS, catalyst, leveling agent, rheological adjuvant, microgel, pigment, pyrogenic silicon dioxide, and mixtures thereof.

13. The coating of claim 1, further comprising a catalyst selected from the group consisting of an organic Sn(IV) compound, an organic Sn(II) compound, an organic Zn compound, an organic Bi compound, a tertiary amine, a latent sulfonic-acid-based catalyst, and mixtures thereof.

14. The coating of claim 13, wherein the catalyst is 0.01 to 0.5 wt % tertiary amine and 0.1 to 7 wt % latent sulfonic-acid-based catalyst, relative to the amount of nonvolatile organic constituents of the coating.

15. A method of preparing a nonaqueous, heat-cured, two-component coating comprising:
   reacting a polyisocyanate comprising at least one aliphatic and/or cycloaliphatic polyisocyanate having 2 to 6 NCO functional groups per molecule with an N-alkyl-3-aminopropyltrialkoxysilane and/or an N-aryl-3-aminopropyltrialkoxysilane, thereby reacting 0.1 to 95 mol % of the isocyanate groups originally present in the polyisocyanate, to form a cross-linking component;
   mixing a polyol component with the cross-linking component, thereby forming a coating,
   wherein the weight ratio of the polyol component to the cross-linking component of said coating is 6:1 to 1:2.

16. The method of claim 15, wherein after reacting said polyisocyanate with said silane, said polyisocyanate is reacted to form a dimer, trimer, urethane, biuret or allophanate compound.

* * * * *

UNITED STATES PATENT AND TRADEMARK OFFICE
CERTIFICATE OF CORRECTION

PATENT NO.     : 6,492,482 B2
DATED          : December 10, 2002
INVENTOR(S)    : Lomoelder et al.

It is certified that error appears in the above-identified patent and that said Letters Patent is hereby corrected as shown below:

<u>Title page,</u>
Item [73], Assignee,
should read -- (73) Assignee: Degussa-Huels Aktiengesellschaft, Frankfurt (DE) --

Signed and Sealed this

Sixth Day of May, 2003

JAMES E. ROGAN
*Director of the United States Patent and Trademark Office*